April 16, 1963 M. DI GIOVANNI 3,086,185
UNBONDED STRAIN GAGE TRANSDUCER
Filed Dec. 13, 1960 2 Sheets-Sheet 2
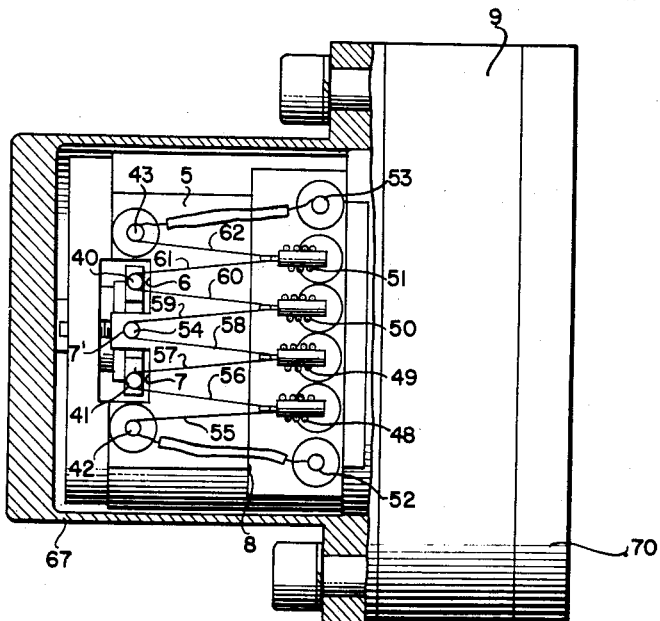
FIG. 2.
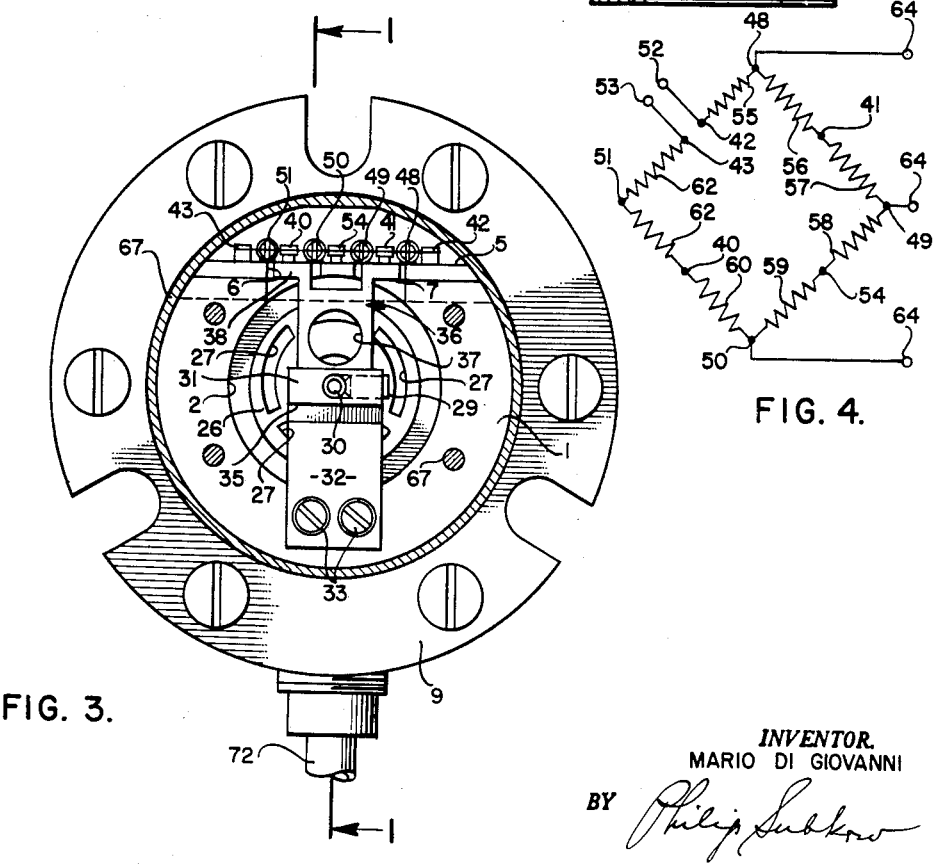
FIG. 3.
FIG. 4.
INVENTOR.
MARIO DI GIOVANNI
BY Philip Subkow
ATTORNEY

United States Patent Office 3,086,185
Patented Apr. 16, 1963

3,086,185
UNBONDED STRAIN GAGE TRANSDUCER
Mario Di Giovanni, Pacific Palisades, Calif., assignor to Statham Instruments, Inc., Los Angeles, Calif., a corporation of California
Filed Dec. 13, 1960, Ser. No. 75,579
4 Claims. (Cl. 338—6)

This invention relates to an improvement in the so-called zero gage length transducers of the unbonded strain wire type disclosed in Louis D. Statham U.S. Patents No. 2,760,037, 2,760,038, 2,760,039 and 2,760,040, and also disclosed in applicant's Patent No. 2,948,873.

This application is a continuation-in-part of my co-pending application Serial No. 61,613, filed on October 10, 1960.

In the patents listed above, an unbonded strain wire transducer is described, in which the strain-sensitive wires are stretched between a wire support which is yieldably mounted and a second wire support which is moved as a result of some force imposed on or some displacement of a motion-transmitting connection and a force-summing means. Another wire is stretched between the first wire support and a third wire support.

The third wire support is so mounted that, when the second wire support is displaced, a relative motion occurs between the second and third support. In such transducers the displacement of the second and third support relative to each other results in increase in tension in one of the wires, called an arm, and a decrease in tension in the other wire or arm. Because the change in tension is opposite in the two arms, they are termed oppositely tensioned arms. They are called arms since the change is resistance in the wires may be measured by making these wires arms of a Wheatstone bridge.

The wires of the pair of the filaments may be of the same length, and a linear separation of the pins at the ends of the filaments with respect to the yieldably supported pin may be zero, and thus the gage length of the transducer may be substantially zero.

Such transducers are then termed zero gage length gages or transducers, and will be so named in this specification.

Metallic filaments called wires are only one example of the piezo-resistive, strain-sensitive filaments which may be used, since the semi-conductive filaments in the form of drawn filaments or slabs may be employed in an equivalent manner. Such materials may be, for example, semi-conductors such as silicon, or oxides or sulfides, or other semi-conductors, both doped or undoped, with P or N junctions.

In order to obtain the desired result in such transducers, whereby a large portion of the reduction in tension occasioned in one of the filaments, when the force-summing means moves toward the yieldable constraint, is transmitted to the other filament of said pair, to cause an increase in tension in the other of said filament, it is desirable to make the stiffness of the yieldable constraint but a small fraction of the stiffness of the wire. This results in springs, used as yieldable constraint, that are very flexible.

In the design of transducers of the form described in Patent 2,760,037, since the movement of the force-summing means is shared between the two filaments of the pair of filaments connected to the yieldable constraint, it is necessary that the force-summing means, connected so as to cause relative movement of the ends of the pair of filaments, be displaced to a distance greater than would be the case where the filament is directly connected to the force summing means at one end and to a fixed point at the other end, to produce a like strain in the tensioned wire. Therefore, in order to obtain a like change in resistance in the active arms of the bridge, the transducer of said Patent 2,760,037 must be designed to permit a multiple of the displacement of the transducer's force-summing means, as compared to the prior art, wherein the wire is stretched from a fixed point at one end to the force-summing means at the other.

When the spring rate of the yieldable constraint is but a fraction of the spring rate of the wire, for example, so that it may be substantially ignored, in order to establish the same strain variation in the filaments as in the former prior art cases where the filament is stretched between the force-summing means and the fixed point, the force-summing means must, in the form of the Patent 2,760,037, where it is directly connected in a one-to-one relationship to the ends of the strain filaments attached thereto, move through substantially twice the deflection as in such prior art fixed-end, unbonded strain gage. Therefore, for the same strain in the wires, the transducers of the aforementioned Patent 2,760,037 will have, for like values of applied acceleration, a lower natural frequency than the transducers employing the prior art unbonded strain wire transducers with fixed ends, for example, 70% (100/√2) of the natural frequency, all other parameters of design being the same.

It is an object of my invention to design a transducer employing the principles of said Patent 2,760,037, to obtain a device of increased natural frequency. This I accomplish by introducing a lever between the strain-sensitive filament and the force-summing means, instead of directly coupling the force-summing means to the strain-sensitive element by a one-to-one connection. The lever is made of substantially greater rigidly, i.e., a spring rate, than that of the strain filaments. It is designed to provide the desired lever ratio and is of such rigidity that the motion of the force-summing means is multiplied by the ratio of the moments about the pivot axis from the connection to the strain filament and to the moment from the force-summing means connection. Thus, one end of the filament connected to the force-summing means moves through a distance which is a multiple of the movement of the force-summing means. Therefore, for like applied acceleration, an inertial mass of the force-summing means, connected to the lever, must travel but a fraction of the distance that is necessary where the wire is directly connected, without mechanical advantage, to the force-summing means. All other design parameters being equivalent, the natural frequency of the inertial mass in the design of the invention of this application will be greater by a factor equal to the lever ratio, as compared to a design where no lever ratio is employed and a 1:1 connection was made between the force-summing means and the end of the tension leg of the wire pair.

These and other objects of my invention will be more fully understood by reference to the drawings of which:

FIG. 2 is a section taken on line 2—2 of FIG. 1; and

FIG. 3 is a section taken on line 3—3 of FIG. 1.

FIG. 4 is a diagram of the Wheatstone bridge arrangement.

Figure 1:
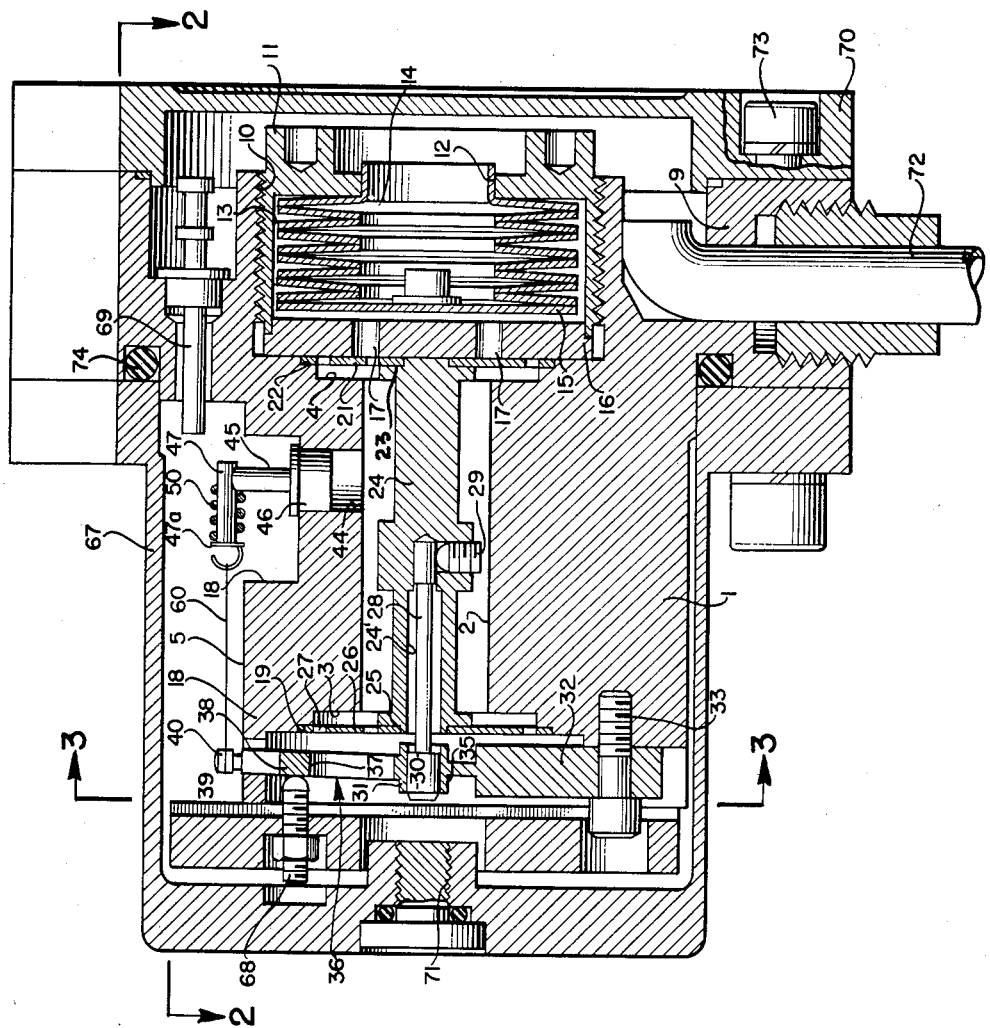
FIG. 1 is a vertical section through one form of the transducer employing my invention.

In FIG. 1, the frame 1, carrying a central bore 2 and counter-bored at the ends 3 and 4, is squared off at the top 5 to give a planar surface. One end of the frame 1 is notched at 6 and 7 (see FIG. 2), longitudinally of the axis of the frame, and notched at 8 transverse the longitudinal axis of the frame. The frame ends in a flange 9.

The flange 9 is bored at 10 to receive a nut 11, which is bored at 12 and counter-bored at 13 to receive a bellows 14 having a plate 15. The base of the nut 10 is closed with a surge plate 16 having surge bores 17.

In the end 18 of frame 1 on shoulder 19 is placed a circular washer 26 having arcuate slots 27 to form a spring washer. A like spring washer 21 is positioned in the shoulder 22 at the other end of the frame. The mass 24 is mounted in the spring washers 21 and 26 at 23 and 25. The mass 24 has a central bore 24', in which is positioned a link pin 28, held in position at one end by the set screw 29.

The flexure 36, having a base 32 mounted on the face of the frame 1 by studs 33, is notched at 35, to form a fulcrum or pivot, and carries a central hub 31 and is relieved by a bore 37. It carries, at the top thereof, a fork 38. The pin 28, having an end 30, fits in the hub 31 and is held in position by a set screw 29 (see FIG. 3).

Insulated pins such as sapphire pins 40 and 41, carrying metallic caps, are positioned upon the fork 38 in longitudinal alignment. Similar pin 54, also capped with a metallic cap, is positioned upon the frame 5, in alignment with the pins 40 and 41. Terminals 42 and 43 are positioned upon the frame 5 and insulated from it. L-shaped brackets, composed of a seat 46, are rigidly positioned into bores 44, a stem 45 and a horizontal bracket 47 of circular cross-section. 45 and 47 are metallic or otherwise electrically conductive. Metallic coil springs 48, 49, 50 and 51 are mounted upon each of the rods 47. One end of the coil spring is rigidly connected as by soldering to the end of the rod 47 and is freely expandable and contractable over said rod 47, there being a slight clearance between the turns of the coil and the external surface of the rod 47. Plate 47a is soldered to the end of the rod 47 after the assembly of the spring. Electrical resistance filaments such as metallic wires or semi-conductive filaments are stretched between the pins and springs in tension, as will be more fully described. Filament 55 is stretched between the terminal pin 42, which is rigidly positioned in the frame 5 and spring 48, and is electrically connected to the spring 48 and the pin 41 which is mounted upon the yoke 38, and is electrically connected, rigidly and electrically, to the metallic cap on pin 40 and to the spring 48. A third wire 57 is stretched between the pin 41 and the spring 49 and similarly, electrically and mechanically connected to the spring 49 and pin 41. The wire 58 is similarly stretched in tension between the spring 49 and the capped pin 54 and electrically connected to them. The pin 54 is rigidly connected to the frame 5. The wire 59 is stretched in tension between the capped pin 54 and the spring 50, and electrically connected to them. The wire 60 is stretched in tension between the spring 51 and the capped pin 43 and electrically connected to them.

It is preferred that the pin mountings for each pair be adjacent to each other so that the filamentary resistors of each pair form an acute angle and that the aligned ends of each of said pairs be in a line parallel to the aligned ends of the pair at their connection to the springs.

The pin 42 is electrically connected to the terminal 52, and the pin 43 is electrically connected to the terminal 53. Five terminals such as 69 are positioned in the flange 9 and are connected by leads, not shown, to the springs 48, 49, 50 and 51, and to the pins 54, 40, 43 42 and 41 for connection into Wheatstone bridge arrangement as illustrated in FIG. 4. Bridge compensation resistors, power supply and measuring devices may be connected to the bridge extrenally, as is usual in such circuits to terminals 64 through a connector 72.

The frame is set in a case 67 which is covered with a cover 70 connected by bolts 73 to make a fluid tight seal by the use of O rings 74. A filll hole 71 with a plug is provided in the end of the case.

Prior to assembly and before the case and cover are mounted, the filaments are wound by deflecting the flexure 36 by means of the adjusting screw 68 to move the pin 40 toward the springs. The wires are then wound under equal tension as previously described.

After the wires are wound, the screw 68 is retracted to a position to permit of the full travel of the flexure 36 to the left, as the mass moves to the left of its neutral position upon oscillation of the case. Upon retraction of the flexure of the screw 68, upon the arrival of the flexure 36 in its neutral, undeflected position, the original strain on the wires 56, 57, 60 and 61 is increased, and the strain on the wires 62, 58, 59 and 55 is reduced to a value substantially less than the strain on the wires connected to the fork 38, due to the deflection of the springs 48, 49, 50 and 51. This permits the oscillation of the mass to both sides of the neutral position and for a transfer of the strain from between each pair of wires, to wit, between the pairs composed of the wires 55 and 56, and the pair of wires 57 and 58, the pair of wires 59 and 60, and the pair of wires 61 and 62, according to the principles as set forth in the Patent 2,760,037, previously referred to.

The case is filled with an insulating oil such as is conventionally used in damping of accelerometer masses. Thus, it fills all spaces outside the bellows 14, which is vented to ambient pressure through opening 12. The oil fills the space between the turns of the coil and the spring guide 47. The spacing is insufficient to permit frictional drag, but is close enough to provide for oil shear to introduce a viscous damping force.

The oscillation of the spring along the rod 47 is additionally limited by the stop 47a, which is welded to the end of the rod 47, and by the limit of compression of the springs, the end of the spring being soldered at 47.

The pin 68 may also be retracted to a desired position to act as a stop for the mass 24, as will the surface 18 of the frame 1.

The deflection of the mass 24 is multiplied by the lever ratio of the lever 36, so that the travel of the mass 24 is made to be a fraction, for example, one-sixth, of the travel of pins 40 and 41.

By providing a flexure at 35 which is of much greater stiffness, i.e., spring constant, than the wires, I may introduce a restraining force in the pins 41 and 40 to oppose the tension in the springs 48 to 51, to maintain the desired tension in the wires. The flexural stiffness of 38 is, for example, 5 to 25 times the spring rate of the wires; for example, 10 times. This provides the necessary bucking force to maintain tension on the wires without introducing such a flexible connection as to materially reduce the natural frequency of the system.

Instead of using oil to provide the damping fluid between the springs and the spring guide rods 47, I may use any viscous or electrically insulating material or one which insulates and has plasticity rather than Newtonian viscosity, provided that it be of low yield point and shear value so as not to introduce unwanted stiffness to the springs. A soft grease may thus be employed, but it is preferred in such case to use limited amounts in order not to introduce under mass on the springs.

While I have described particular embodiment of my invention for the purpose of illustration, it should be understood that various modifications and adaptations thereof may be made within the spirit of the invention, as set forth in the appended claims.

I claim:

1. An unbonded strain filament transducer comprising a frame, a first and a second unbonded strain-sensitive filamentary resistor, a first mounting on said frame, one end of the first filamentary resistors mechanically connected to said first mounting, said first filament on said mounting being insulated from said frame, a second mounting, one end of the second filamentary resistors mechanically connected to said second mounting, said second filamentary resistor on said mounting being insulated from said frame, a spring mounted on said frame and spaced longitudinally from said first and second mountings, one end of each of said resistors connected to said spring, a force-summing means, a lever, one end of said lever connected to said frame, said second mounting connected to said lever at a point spaced from said connection of said lever to said frame, and a force-summing means connected to said lever at a point intermediate said points of connection of said second mounting and of said lever to said frame.

2. In the transducer of claim 1, a pivot for said lever, said force-summing means connected at a spaced point from said pivot, said second mounting connected to said lever at a point more remote from said pivot than said connection to said force-summing means.

3. In the transducer of claim 2, in which said lever is a flexure.

4. In the transducer of claim 3, in which the spring rate of the flexure is substantially higher than that of the strain-sensitive filaments.

References Cited in the file of this patent

UNITED STATES PATENTS

| | | |
|---|---|---|
| 2,760,037 | Statham | Aug. 21, 1956 |
| 2,909,743 | Statham | Oct. 20, 1959 |

FOREIGN PATENTS

| | | |
|---|---|---|
| 695,755 | Great Britain | Aug. 19, 1953 |